United States Patent [19]
Ethington et al.

[11] 3,940,762
[45] Feb. 24, 1976

[54] DIGITAL DETECTION CRITERIA CONTROL DEVICE FOR VIDEO MAPPING, DETECTION PARAMETER CONTROL, OPTIMUM RADAR RECEIVER SELECTION AND REJECTION OF NON-MOVING TARGETS

[75] Inventors: David A. Ethington, La Mirada; Richard D. Wilmot, Fullerton; Herbert Y. Yamashiro, La Mirada, all of Calif.

[73] Assignee: Hughes Aircraft Company, Culver City, Calif.

[22] Filed: Sept. 9, 1965

[21] Appl. No.: 486,047

[52] U.S. Cl. ............................................. 343/5 DP
[51] Int. Cl.² .......................................... G01S 9/02
[58] Field of Search........................ 343/5 DP, 17.1

Primary Examiner—Malcolm F. Hubler
Attorney, Agent, or Firm—James K. Haskell; Robert H. Himes

[57] ABSTRACT

A digital detection criteria control device for use in a radar tracking system incorporating a memory that is electronically synchronized to a surveillance radar in a manner to perform video mapping and control functions. This memory is organized so that each small quantum area of the radar's surveillance area has code bits which are controlled primarily by inputs from valid and invalid video return detectors. These detectors examine quantized video returns from the radar for certain bit densities and bit patterns to determine whether the video returns are valid or invalid targets. The code bits provide a history of the type of video return for each quantum area thereby making a more accurate indication of the nature of the video return possible.

6 Claims, 8 Drawing Figures

DIGITAL DETECTION CRITERIA CONTROL DEVICE FOR VIDEO MAPPING, DETECTION PARAMETER CONTROL, OPTIMUM RADAR RECEIVER SELECTION AND REJECTION OF NON-MOVING TARGETS

This invention relates to radar data processing apparatus and, more particularly, to digital apparatus including a memory which is electronically synchronized to a surveillance radar to perform video mapping and control functions.

In contemporary radar data processing systems, it is the general practice to employ digital computers to distinguish between valid and invalid targets and to track the valid targets. The area covered by a surveillance radar seldom has uniform characteristics. Clouds, for example, may generate hundreds of additional targets per scan. Thus, if the sensitivity of the surveillance radar is adjusted to an optimum value for one portion of the area covered by the radar, the remaining area will usually generate sufficient targets to overload the computer thereby rendering the entire data processing system temporarily inoperative. In order to avoid having the system become inoperative, a very large commputer is often employed.

It is, therefore, an object of the present invention to provide an improved digital detection criteria control apparatus whereby the size of an associated computer is minimized.

Another object of the present invention is to provide a radar data processing apparatus that allows the best possible target detection in each quantum area of the surveillance area covered by the radar.

Still another object of the present invention is to provide apparatus for eliminating stationary returns without using expensive computer programs and computer memory.

A further object of the present invention is to provide apparatus for establishing an appropriate system operational mode for each quantum area whereby a localized disturbance does not degrade automatic operation of the system over the entire surveillance area.

A still further object of the present invention is to provide a digital detection criteria control apparatus including a memory that is electronically synchronized to a surveillance radar and containing code bits for retaining a history of the type of video returns from each quantum area of the surveillance area.

Another object of this invention is to provide an apparatus capable of allowing the detection criteria to be selected either manually or automatically for any quantum area in the total radar surveillance area.

A further object of this invention is to provide an apparatus capable of having the video quantizing level (the skim level) selected either manually or automatically for any quantum area in the total radar surveillance area.

A still further object of this invention is to provide an apparatus capable of allowing any radar receiver to be selected either manually or automatically for any quantum area in the overall radar surveillance area.

More particularly, the digital detection criteria control device of the present invention incorporates a memory which is electronically synchronized to a surveillance radar in a manner to perform video mapping and control functions. This synchronized memory is organized so that each small quantum area of the radar's surveillance area has memory code bits which are controlled by an up-down counter. The up-down counter is, in turn, controlled primarily by inputs from two sources, namely, from valid and invalid video return detectors. These detectors examine the quantized video returns for certain hit densities and hit patterns to determine the presence of a valid or invalid video target return. A more accurate indication of the nature of the video return is possible with the memory code bits of the synchronized memory than can be determined from a single sample in that the memory code bits provide a history of the type of video return for each quantum area which typically is only a few square miles.

The codes stored in the memory are controlled by the counter in the following manner: the valid and invalid detectors are sampled every scan; if both are true, a count up signal is generated. When both valid and invalid detectors are false in response to a sample from the selected radar receiver, a count down signal is initiated. On the other hand, every sixth scan only valid target indications are sampled and the presence or absence of a valid target indication generates a count up or count down signal. This will eliminate stationary returns which do not have a clutter pattern, such as stationary point source returns, but will not reject moving targets because moving targets will appear for only 2 or 3 sample periods in the same area. In addition, a count-up signal is initiated every time a "False Target Alarm Rate Too High Signal" is received. This signal is generated when the number of tracks which do not correlate in position (noise generated tracks) exceed a certain specified rate such as, for example, ten per scan or one per second (a typical scan time is 10 seconds). Similarly, a "False Target Alarm Rate Too Low Signal" is generated for counting down when the detection process is too insensitive.

Each time the code changes, the detection parameters, system operation mode (e.g., auto-acquire, auto-update or manual control) as well as the radar receiver selection can be changed. By way of example, if a cloud entered the radar's surveillance area, the code would be changed once every scan for the quantum areas that received both valid and invalid target indications. Typically, the first scan during which this occurred, the detection criteria and video quantizing threshold would be changed; the next succeeding second sample in which valid and invalid target indications were received, the radar receiver would be changed to a log or MTI type; next, the auto-acquisition would be inhibited; and finally auto-updating would be inhibited. After the cloud had passed, the code bits would be counted back down. In this way, the effect of localized disturbances can be minimized.

In addition to the automatic control for specific areas, such as a cloud in one particular area as described above, the system false target rate can be used to set the codes to make the detection criteria control more accurate so that the system false alarm rate is set at an optimum value. A reasonably accurate count of the system false target rate may be found by measuring the number of targets that do not correlate in position from scan to scan; these represent targets generated by noise. Other false targets caused by weather or ground clutter can be detected by their hit patterns, hit densities, and by the fact that they are not moving; these targets are inhibited before they enter the correlation and tracking system; thus, these returns will not affect the system false alarm rate. Therefore, the detection criteria is controlled by two closed loop feedback signals; one representing invalid and valid targets in a quantum area and the other representing the total system false target rate (which is primarily due to noise generated targets). Thus, the automatic code control allows the best detection possible in any quantum area; i.e., in clear areas weak targets can be detected and in noisy areas "see through" capability is automatically provided for strong target returns by the automatic selection of radar receivers and detection parameters. Manual entries allow an operator to override the autocode and select the code he desires. The code selected permits the operator to choose the desired detection criteria, video quantizing level and radar receiver for any quantum area. This represents a marked improvement over previous system designs which used range gating to select radar receivers and detection criteria.

The above-mentioned and other features and objects of this invention and the manner of obtaining them will become more apparent by reference to the following description taken in conjunction with the accompanying drawings, wherein.

In describing the apparatus of the present invention, a convention is employed wherein individual "and" and "or " gates are shown as semicircular blocks with the inputs applied to the straight side and the output appearing on the semicircular side. An "and" gate is indicated by a dot (·) and an "or" gate by a plus (+) in the semicircular block. As is generally known, an "and" gate produces a "one" or information level output signal only when every input is at the information level; whereas, an "or" gate produces an information level output signal when any one of the input signals applied thereto are at the information level. Further, in describing the operation of "and" and "or" gates, a dot (·) or a plus (+) is inserted between the quantities operated upon to indicate the "anding" and "oring" operations, respectively. An inverter is shown as a semicircular block with an I symbol in the block; it performs a logical complement function.

Also, in addition to the above, a convention is employed in describing the particular embodiment of the present invention wherein the two inputs of the flip-flops are designated as "set" and "reset" inputs. An information level signal applied to either the set or reset inputs of a flip-flop will change its state in a manner such that an information level signal appears at the corresponding principal or complementary output terminal. Further, if information level signals are applied to both the set and reset inputs of a flip-flop, the flip-flop will revert to the reset state. If no input signals are applied, the flip-flop will remain in its previous state.

The principal output from a flip-flop is designated Q and the complementary output $\overline{Q}$. The principal output from a logic control function is designated X and its complement $\overline{X}$.

Further, in the following description, it is presumed that flip-flops having a negligible delay time are employed whereby logic propagation is complete at the termination of each range bin or bit interval. If delay time cannot be made negligible, it becomes necessary to employ synchronizing means to compensate for the different delays which occur in processing so that the control bits are properly aligned with the quantized video bits. The use of synchronizing delay means is well known in the digital computer art.

Figure 1:
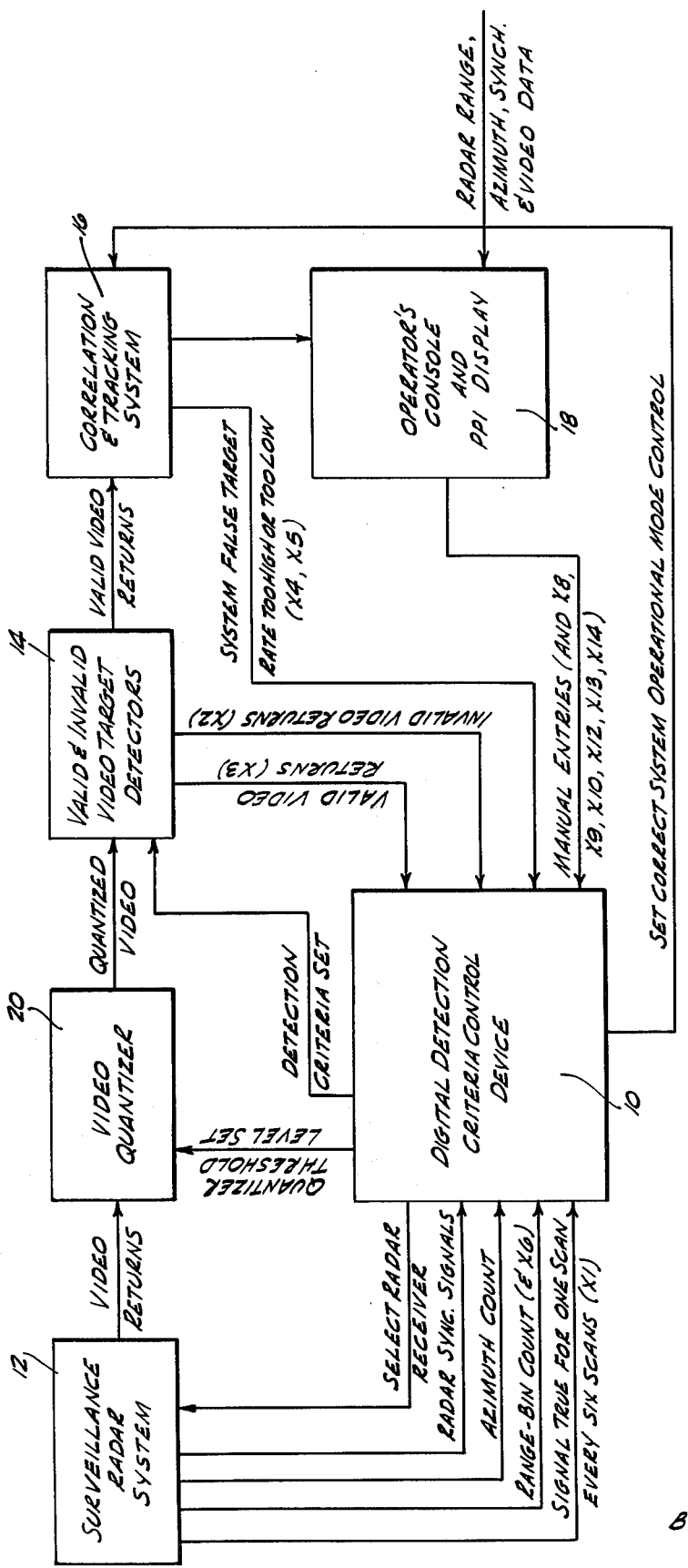
FIG. 1 illustrates a schematic block diagram of a radar data processing system incorporating the digital detection criteria control apparatus of the present invention.

Referring now to FIG. 1 of the drawings, there is shown a block diagram of an embodiment of the present invention wherein a digital detection criteria control device 10 receives radar synchronization, and scan signal XI and range bin count signals from a surveillance radar system 12 together with valid non-moving and invalid video return indications X3, X2 from valid and invalid video target detectors 14, a system false target rate too high or too low indication X4, X5 from a correlation and tracking system 16 and manual switch entries from an operator's console 18. The surveillance radar system 12 receives the control signals to select the optimum radar receiver from the digital detection criteria control device 10 and, in turn, generates video returns which are applied to a video quantizer 20. Video quantizer 20 generates a quantized video signal which constitutes a 1 or hit indication every time the video exceeds a certain threshold level in successive range bins and a 0 or no hit indication every time the video does not exceed this threshold level. This threshold level is controlled by an optimum quantizer threshold level set signal received from the digital detection criteria control device 10.

The quantized video signal from the video quantizer 20 together with an optimum detection criteria set signal generated by the digital detection criteria control device 10 are applied to the valid and invalid video target detectors 14. The valid and invalid video target detectors in response to these signals generate valid non-moving (and some valid moving target returns) and invalid video returns which are applied to the digital detection criteria control device 10, as previously specified, and valid video returns which are applied together with a set correct system operational mode control signal from the digital detection criteria control device 10 to the correlation and tracking system 16. The valid and invalid video target detectors may be of the type described in co-pending applications for patent, Ser. No. 440,024, entitled "Radar Video Processing Apparatus," by Richard Dean Wilmot, filed Mar. 15, 1965, now U.S. Pat. No. 3,878,530, and Ser. No. 445,130, entitled "Radar Video Processing Apparatus," Richard Dean Wilmot, Inventor, filed Apr. 2, 1965, now U.S. Pat. No. 3,727,215. The correlation and tracking system 16 generates the "system false target rate too high or too low signals" X4, X5 applied to the digital detection criteria control device 10 and a valid video return output which is applied to the operator's console 18.

Figure 2:
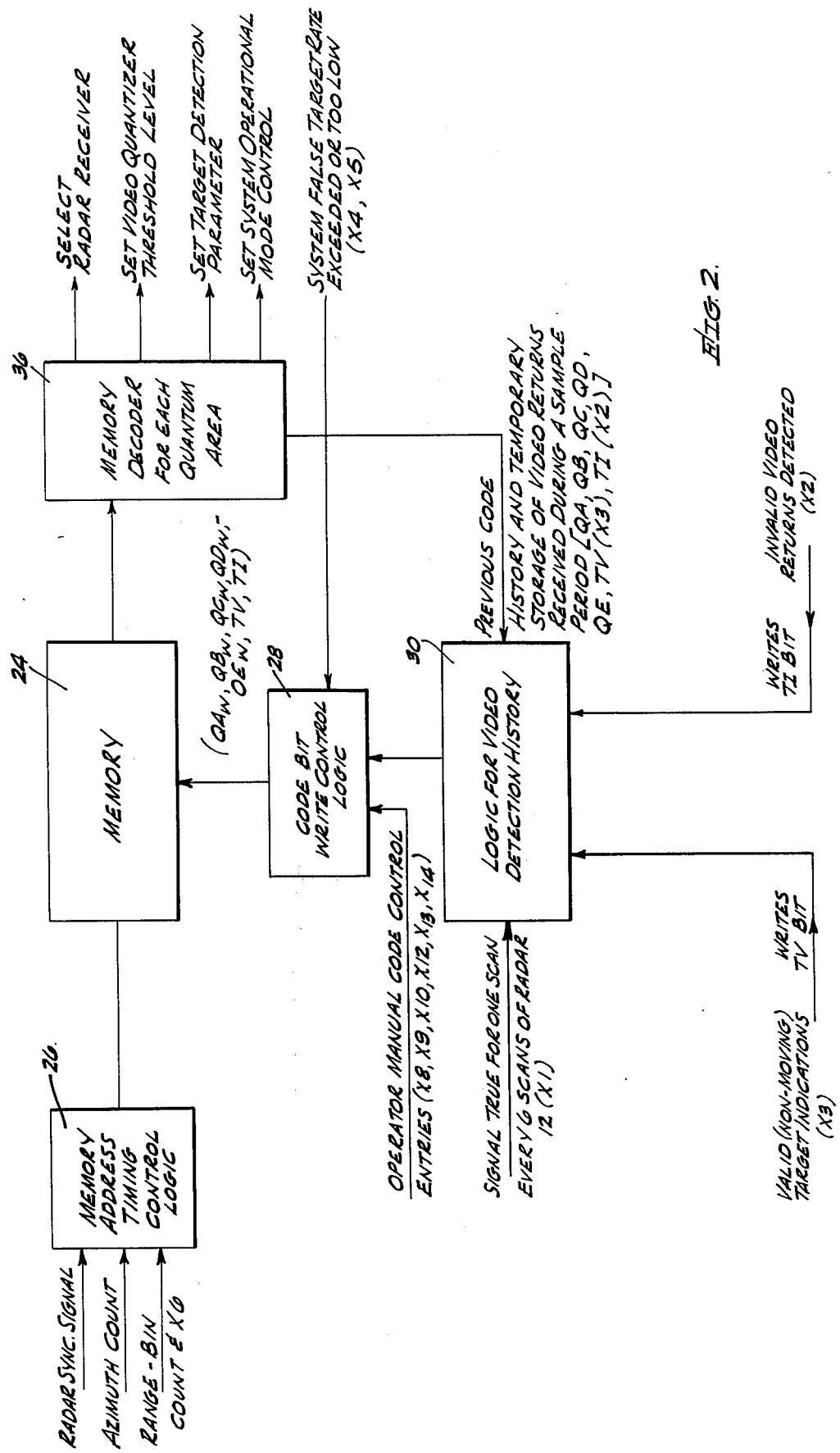
FIG. 2 shows a schematic block diagram of the digital detection criteria control apparatus of FIG. 1.
Figure 3:
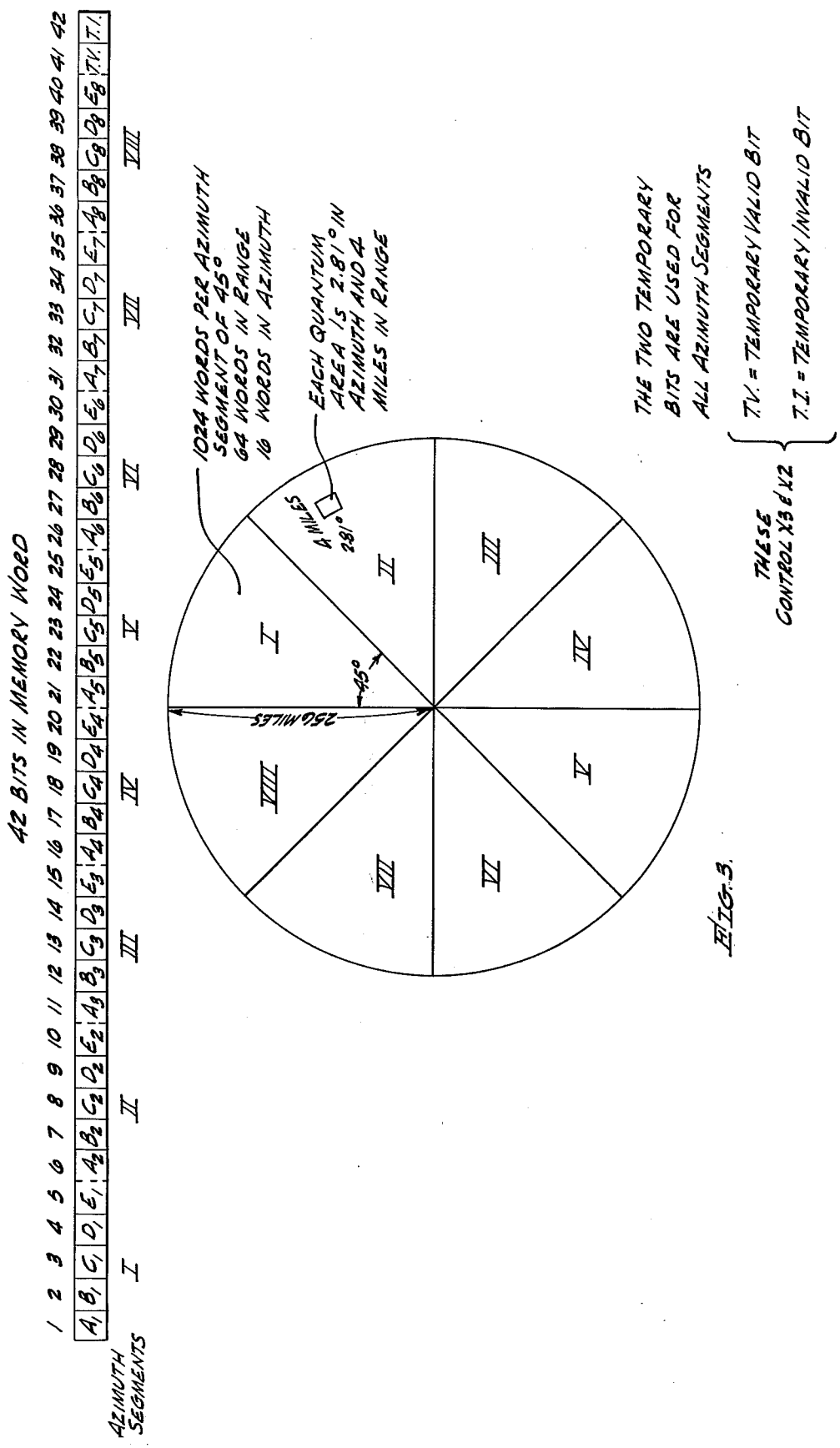
FIG. 3 illustrates the manner in which the bits of each word in memory 24 are allocated to the sectors of the surveillance area.
Figure 4:
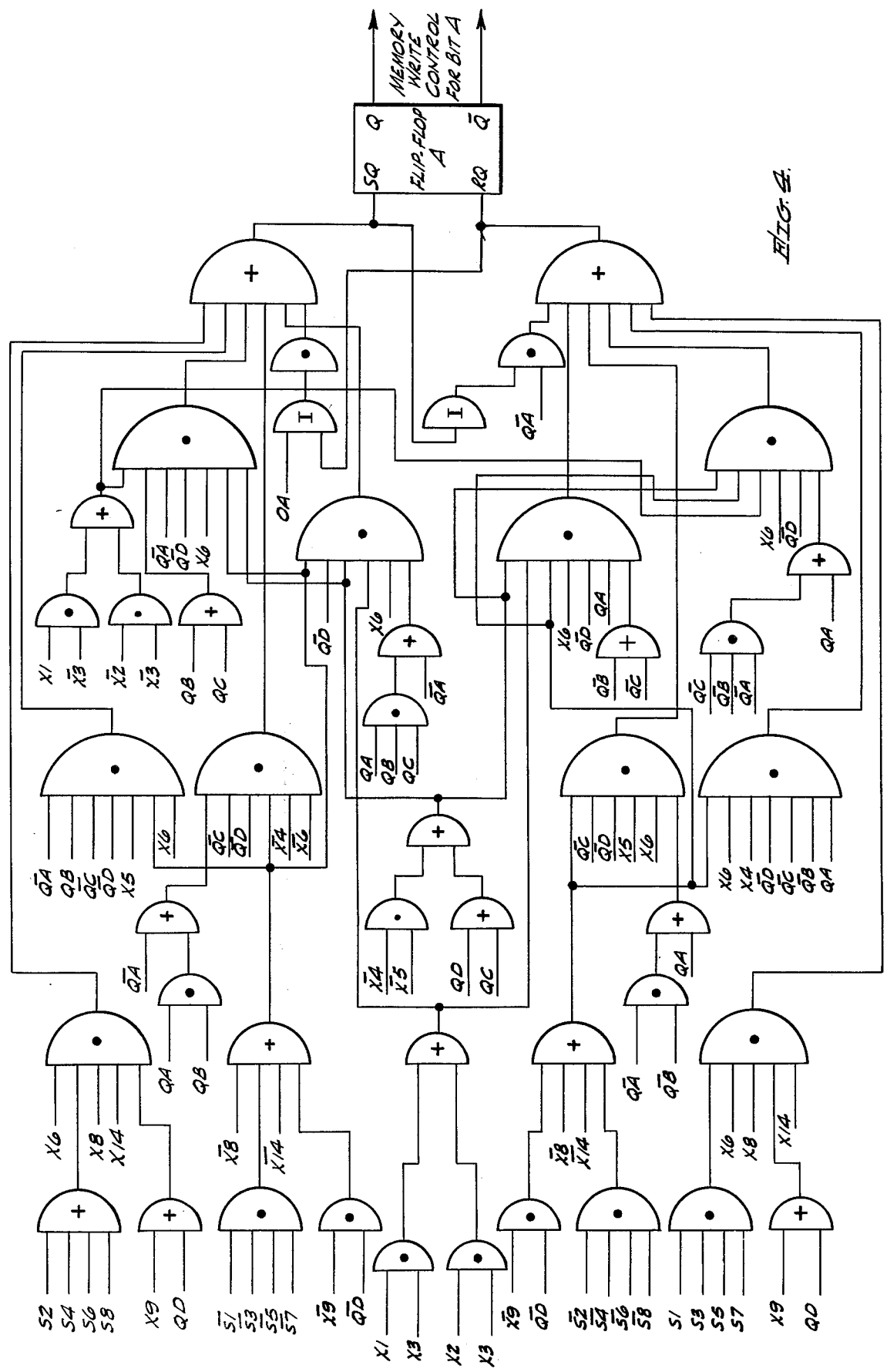
FIGS. 4, 5, 6 and 7 illustrate the count logic for Write Control Flip-Flops ABCDE.
Figure 5:
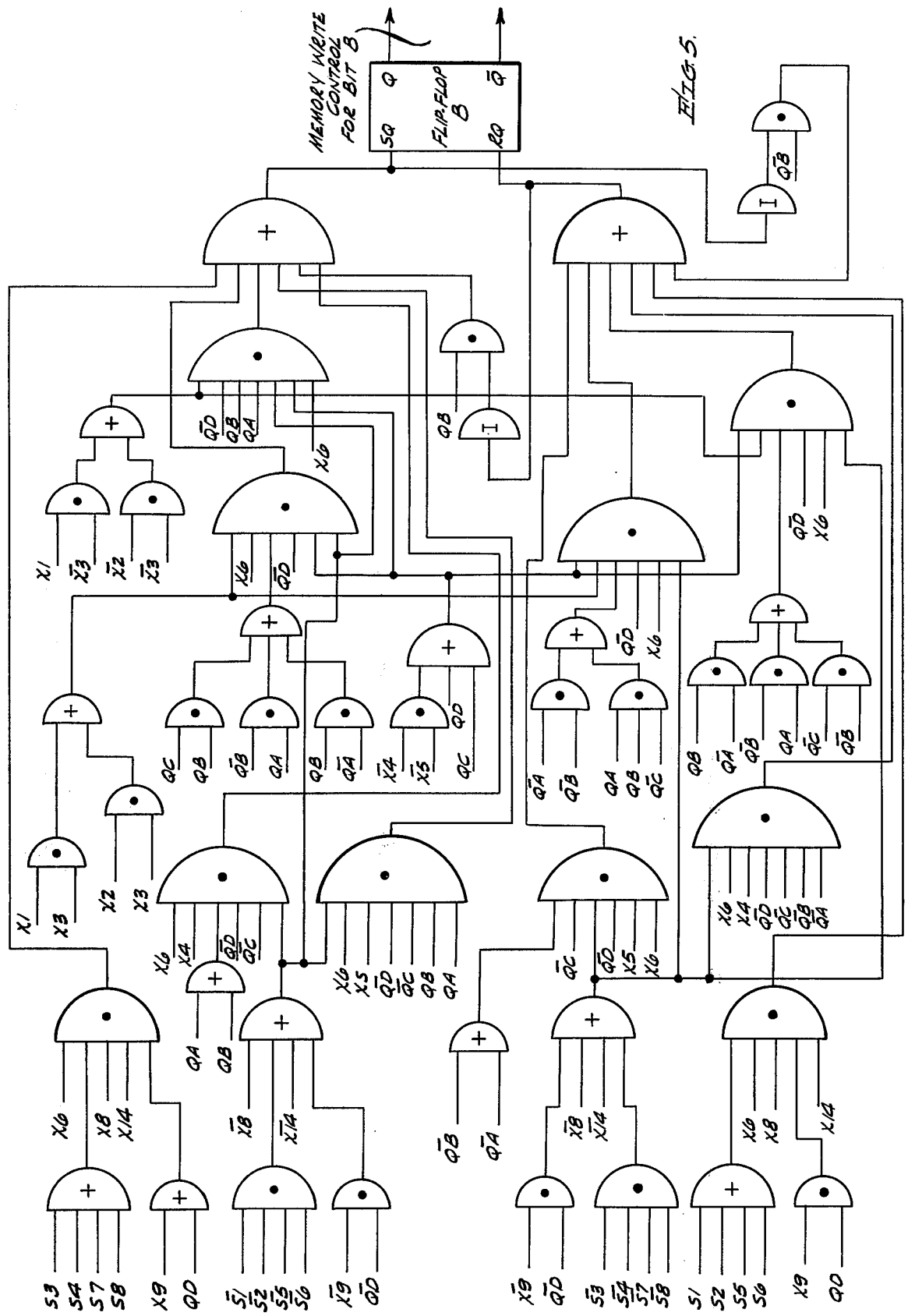
Figure 6:
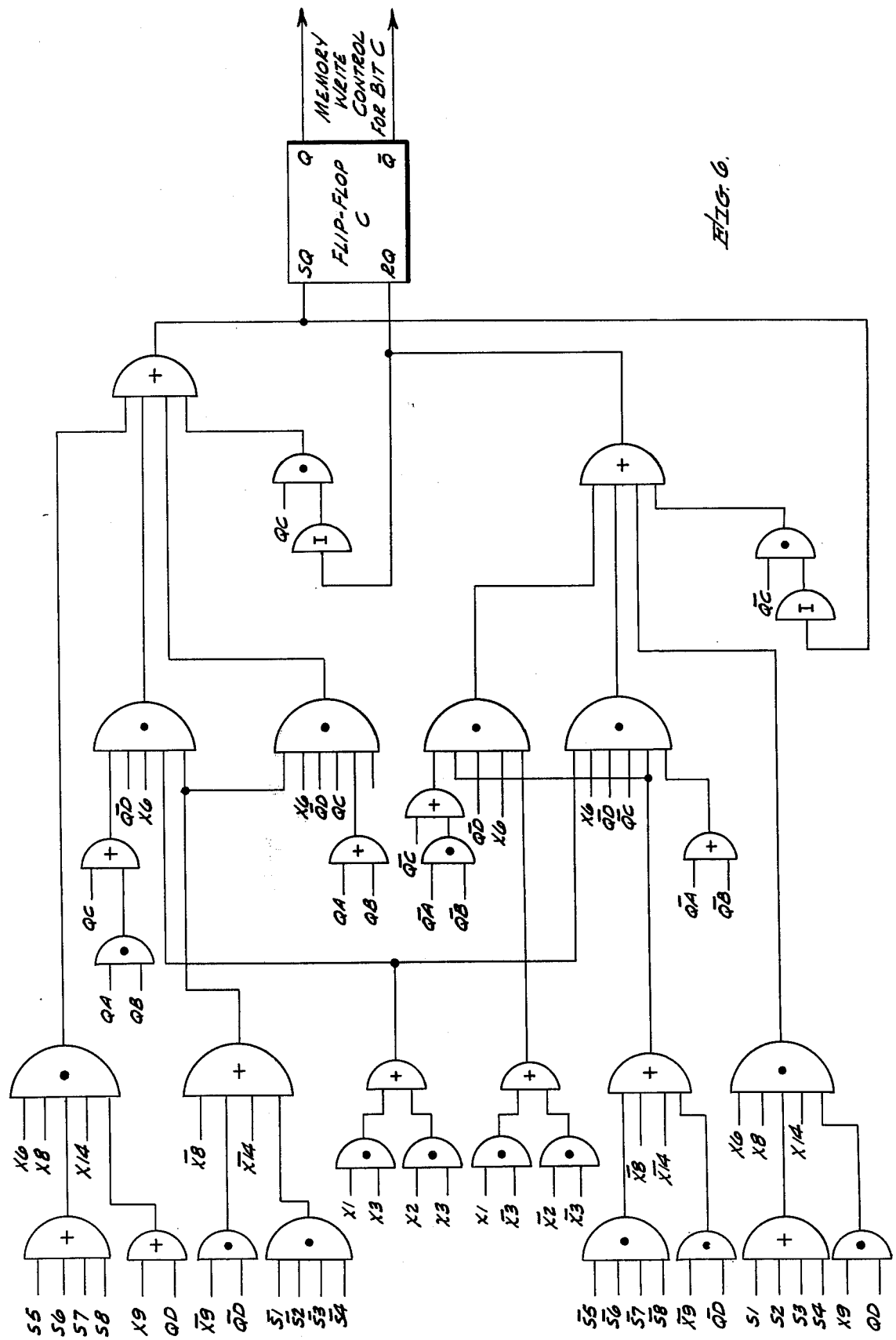
Figure 7:
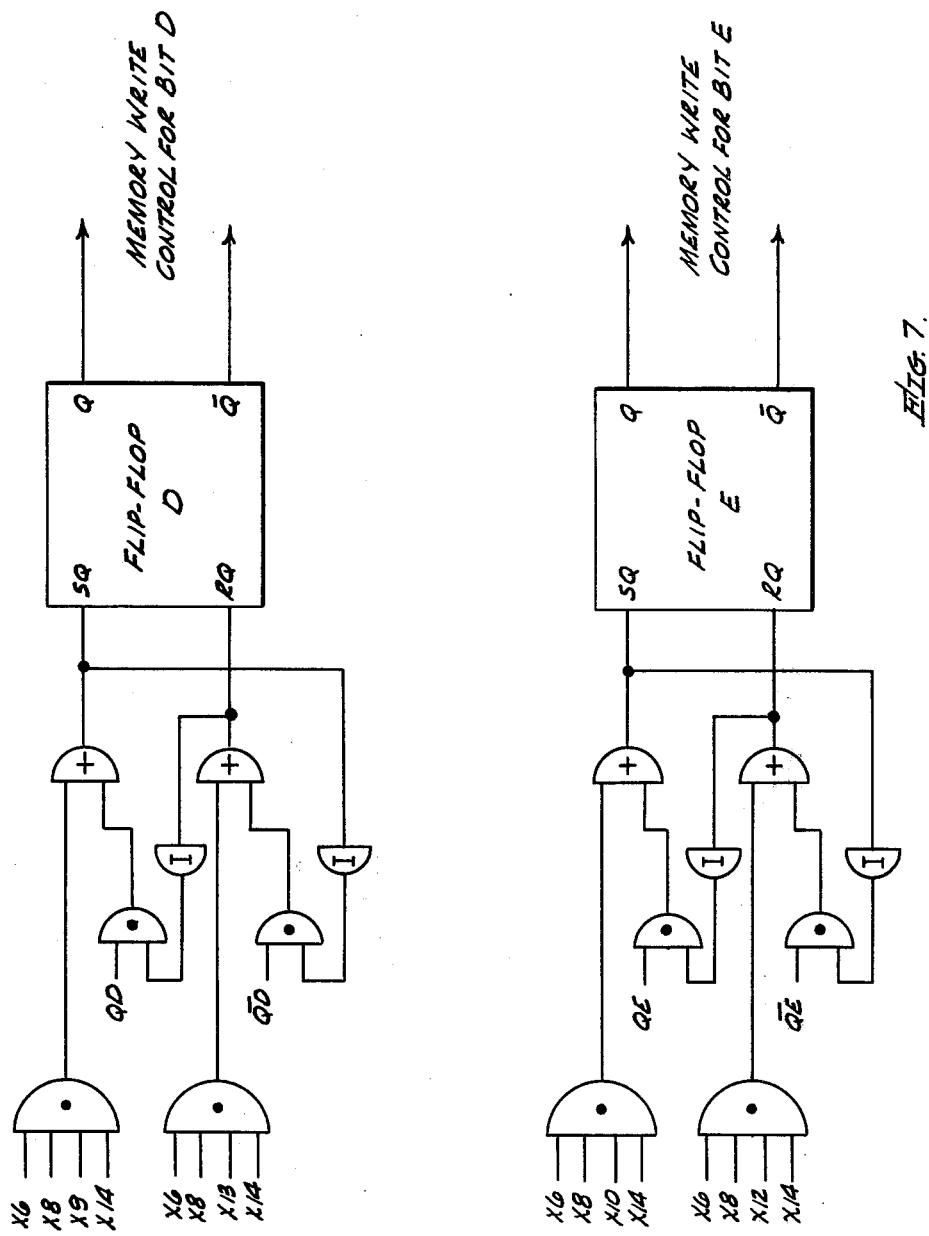

Referring now to FIG. 2 of the drawings, there is shown a schematic block diagram of the digital detection criteria control device 10 in the apparatus of FIG. 1. In particular, the device 10 includes a core memory 24 which is controlled by memory timing control logic apparatus 26 which operates in response to the range-bin count and azimuth segment count and radar synchronizing signals available from the surveillance radar system 12. There are no restrictions on the memory size or type except it must be synchronized with the radar and that the writing and reading of memory data must be done in real time. The quantum area size and number of code bits per quantum area are variable. Referring to FIG. 3, there is shown a typical example of the type of memory organization that can be used with a core memory having 1024 words of 42 bits each that are organized to give 5 bits per quantum area with the two spare bits designated T.V. for temporary valid bit and T.I. for temporary invalid bit. For this 5 bit arrangement, a 360° surveillance area is divided into eight azimuth sectors I, II, III, IV, V, VI, VII, VIII of 45° each. This allows all of the 1024 words to be addressed each sector, and a counter included in the memory address timing control logic apparatus 26 controls which of the different sets of 5 bits each is used so that all bits are used. Each set of 5 bits is designated A, B, C, D and E with subscripts to correspond with the sector. The eight azimuth sectors I, II, III, IV, V, VI, VII and VIII, are each divided into 1024 quantum areas by the addressing of the 1024 words. A convenient size is to use quantum areas of 2.81° by 4 miles; this allows each group of 1024 addresses to be divided into 16 for azimuth and 64 for range (16 × 64 = 1024). This makes each surveillance sector 16 × 2.81° = 45° in azimuth and 64 × 4 = 256 miles in range. This gives a tital of 8,192 quantum areas with 5 bits each; their size is 2.81° in azimuth and 4 miles in range. This gives coverage of the radar surveillance area of 360° in azimuth and 256 miles in range.

The above example indicates the flexibility and versatility of the digital detection criteria control device 10 of the present invention; minor changes in the organization of the memory 24 will allow the control device 10 to be used with different effects. Also, it is apparent that the memory 24 can be organized to fit a particular radar's surveillance area.

If automatic control based on video return history is desired, the spare memory bits TV and TI can be used to give a temporary storage of the results of the valid and invalid video detectors. This temporary storage is useful because a quantum area is typically 28 sweeps in azimuth and 8 range bits in range. To ensure that all detection cells have been sampled, it is necessary to wait until the last range bin of the last radar sweep. The spare bits in each memory word can be used for temporary storage of whether or not valid or invalid video detections occurred during the sample period. The temporary storage bits are reset at the end of the quantum area; thus, they can be used over and over again irrespective of the group of bits used in the different azimuth segments.

Referring again to FIG. 2, information is written into the core memory by means of a code bit write control logic apparatus 28 which receives operator manual code control entries X8, X9, X10, X12, X14, system false target rate too high or too low signals X4, X5, and input signals from logic apparatus 30 for automatic code control. The logic apparatus 30 receives valid target indications X3, invalid video returns detected X2 for invalid video returns and previous code history and temporary storage signals QA, QB, QC, QD, TV and TI from a memory decoder apparatus 36 which reads information out of the memory (which is typically a core memory) 24. The memory decoder 36, in addition to reading information out of the core memory 24 to provide the logic apparatus 30 with the previous code history, includes appropriate gating to generate "select radar receiver" signals, "set video quantizer threshold level" signals, "set target detection parameters" signals, and "set operational mode control" signals in response to QA, QB, QC, QD, and QE signals.

Following is a table (Table A) illustrating a typical use of a five bit code control in accordance with the invention:

TABLE A

| Beacon Processing | Operator Control of Codes | Code Control Bits | | | Operating Mode | Receiver | ** Skim Level | k/w | *** Valid or Invalid Target Detections |
|---|---|---|---|---|---|---|---|---|---|
| E | D | C | B | A | | | | | |
| * | 0 | 0 | 0 | 0 | A.A. | Normal | 3 | 8/13 | 0 |
|  | 0 | 0 | 0 | 1 | A.A. | Normal | 4 | 9/13 | 1 |
|  | 0 | 0 | 1 | 0 | A.A. | Normal | 6 | 10/13 | 2 |
|  | 0 | 0 | 1 | 1 | A.U. | Normal | 12 | 11/13 | 3 |
|  | 0 | 1 | 0 | 0 | A.U. | Log | 15 | 9/13 | 4 |
|  | 0 | 1 | 0 | 1 | A.U. | Log | 18 | 10/13 | 5 |
|  | 0 | 1 | 1 | 0 | A.U. | M.T.I. | 21 | 11/13 | 6 |
|  | 0 | 1 | 1 | 1 | I.A. | M.T.I. | 24 | 12/13 | 7 or more |
|  |  |  |  |  |  |  |  |  | Switch |
|  | 1 | 0 | 0 | 0 | A.A. | Normal | 3 | 8/13 | S1 |
|  | 1 | 0 | 0 | 1 | A.A. | Normal | 6 | 10/13 | S2 |
|  | 1 | 0 | 1 | 0 | A.A. | Normal | 12 | 11/13 | S3 |
|  | 1 | 0 | 1 | 1 | A.U. | Normal | 15 | 10/13 | S4 |
|  | 1 | 1 | 0 | 0 | A.U. | Log Fast Time | 18 | 9/13 | S5 |
|  | 1 | 1 | 0 | 1 | A.U. | Constant Integrated | 18 | 9/13 | S6 |
|  | 1 | 1 | 1 | 0 | A.U. | Video | 18 | 9/13 | S7 |
|  | 1 | 1 | 1 | 1 | I.A. | M.T.I. | 18 | 9/13 | S8 |

* 1 = Automatic Beacon Processing
  0 = No Automatic Beacon Processing
** (db above R.M.S. Noise)
*** or Valid Detections Every 6th Scan The following abbreviations were used in Table A:
A. A. designates "Automatic Acquisition and Updating";
A. U. designates "Automatic Updating with Manual Acquisition";
I. A. designates "Inhibit Automatic Acquisition and Updating: Manual Tracking Mode";
M. T. I. designates "Moving Target Indicator."

The above Table A illustrates a typical manner for controlling the receiving characteristics of the surveillance radar system 12 and the threshold of video quantizer 20 in response to various combinations of the code bits A, B, C, D and E. In particular, the code bit E is used to initiate automatic data processing of radar beacon identification signals and the code bit D is used to provide manual override of the code bits for selected quantum areas of the surveillance area. Manual operation may be achieved by means of a switching system that is synchronized with the memory 24 as described in copending application for patent entitled: "Video Mapping Device," Richard Dean Wilmot, et al., Inventors, Ser. No. 460,267, filed June 1, 1965, now U.S. Pat. No. 3,325,806. This application for patent also describes a technique for timing and control for writing and recirculation of temporary memory bits for each quantum area.

The criteria for changing the remaining code bits A, B and C may vary to accommodate different circumstances. Logical equations have been developed to achieve the following mode of operation:

1. Count-up every scan in response to a true signal from both valid and invalid detectors 14. In this respect, the code bits are considered a binary number with A as the least significant, B, the next least significant and C the most significant bit.
2. Count-down every scan in response to a false signal from both valid and invalid detectors 14.
3. Count-up every sixth scan in response to a valid target indication and no invalid target indication to eliminate stationary, point source returns.
4. Count-up every time a "False Target Alarm Rate Too High" signal is received from correlation and tracking system 16. This signal is true when the number of targets which do not correlate in position exceed the rate of 10 per scan or one per second, a typical scan time being 10 seconds. Targets which do not correlate in position from scan to scan are either noise targets or new targets. The correlation and tracking system 16 generates the False Target Alarm Rate Too High by counting the time interval in seconds required to generate 32 uncorrelated targets. If this time is 32 seconds or less, the "False Alarm Rate Too High" signal is true. If the time is between 32 and 96 seconds, no correction signal is generated. If the time is greater than 96 seconds, a "False Alarm Rate Too Low" signal is generated. When this signal is true, the count decrements by one in those sectors in which the normal receiver is selected.

Logic for the above-described mode of operation can assume many different forms, only one example of which is presented by way of illustration. Referring to FIG. 2, the code bit write control logic includes a flip-flop (not shown) for each code bit, i.e., a total of 42 memory write control flip-flops. In the following logical equations, an $\omega$ subscript indicates the write control signal, a Q preceding this signal designates that it is a flip-flop signal, an S preceding the Q designates that it is applied to the respective set input, and an R preceding the Q designates that it is applied to the respective reset input; a bar over these terms indicates the logical complement of the term. No $\omega$ subscript, on the other hand, indicates an output from read sense amplifiers (not shown) included in the memory decoder for each quantum area 36, a Q preceding the signal designating a principal output and a $\overline{Q}$ preceding the signal and with the bar extending over the designation for the signal indicates a complementary output. Also, signals designating the eight separate channels corresponding to sectors I – VIII are generated by the memory address timing control 26 for use by the memory decoder for each quantum area 36 to control which set of bits will be recirculated and which will be updated. It is considered well within the present scope of computer art to synchronize memory 24 so that successive outputs $X6_{1-8}$ correspond, respectively, to sectors I to VIII, FIG. 3.

The following logical function signals are required as follows for inputs to the Digital Detection Criteria Control Device 10:
XI: A signal true for 1 scan every six scans;
X2: Invalid video detected or TI bit true;
X3: Valid video detected or TV bit true;
X4: False alarm rate too high;
X5: False alarm rate too low;
$X6_{1-8}$: Last range bin of last sweep of quantum area of the current azimuth segment;
X8: Operator is entering data;
X9: Code bits are to be controlled manually;
X10: Process beacon replies automatically;
X12: Process beacon replies manually;
X13: Code bits are to be controlled automatically;
X14: Real time range - azimuth comparison true for area selected by console operator and the D.C.C. memory address.

The Code Bit Write Control Logic Apparatus 28, together with Logic for Video Detection History Apparatus 30 includes appropriate gating for generating memory write control signals as shown in FIGS. 5 through 8. The operation of the logic functions in these diagrams are best described by Boolean equations; these are listed below:

$$SQA_\omega =$$
$$X6 \cdot \underline{X8 \cdot (S2+S4+S6+S8) \cdot (X9+QD) \cdot X14} \quad \text{(Manual Switch Entries)}$$
$$+ X6 \cdot (\overline{X8+S1 \cdot S3 \cdot S5 \cdot S7+X9 \cdot \overline{QD}+X14}) \quad \text{(Count Up for High False}$$
$$\cdot X4 \cdot \overline{QD} \cdot \overline{QC} \cdot (\overline{QA}+QA \cdot QB) \quad \text{Alarm Rate)}$$
$$+ X6 \cdot (\overline{X8+S1 \cdot S3 \cdot S5 \cdot S7+X9 \cdot \overline{QD}+X14}) \quad \text{(Count Down for Low False}$$
$$\cdot X5 \cdot \overline{QD} \cdot \overline{QC} \cdot QB \cdot \overline{QA} \quad \text{Alarm Rate)}$$
$$+ X6 \cdot (\overline{X8+S1 \cdot S3 \cdot S5 \cdot S7+X9 \cdot \overline{QD}+X14}) \quad \text{(Automatic Count Up)}$$
$$\cdot (\overline{X4 \cdot X5}+QD+QC) \cdot \overline{QD} \cdot (\overline{QA}+$$
$$QA \cdot QB \cdot QC)$$
$$\cdot (X1 \cdot X3+X2 \cdot X3)$$
$$+ X6 \cdot (\overline{X8+S1 \cdot S3 \cdot S5 \cdot S7+X9 \cdot \overline{QD}+X14}) \quad \text{(Automatic Count Down)}$$
$$\cdot (\overline{X4 \cdot X5}+QD+QC) \cdot \overline{QD} \cdot \overline{QA} \cdot (QB+QC)$$
$$\cdot (X1 \cdot \overline{X3}+\overline{X2 \cdot X3})$$
$$+\overline{RQA_\omega} \cdot QA \quad \text{(Recirculate A One)}$$
$$RQA_\omega =$$

|  |  | -continued |
|---|---|---|
| | X6. X8.(S1+S3+S5+S7).(X9+QD).X14 | (Manual Switch Entries) |
| + X6. | ($\overline{X8}$+$\overline{S2}$.$\overline{S4}$.$\overline{S6}$.$\overline{S8}$+$\overline{X9}$.$\overline{QD}$+$\overline{X14}$) .X4.$\overline{QD}$.$\overline{QC}$.$\overline{QB}$.QA | (Count Up for High False Alarm Rate) |
| + X6. | ($\overline{X8}$+$\overline{S2}$.$\overline{S4}$.$\overline{S6}$.$\overline{S8}$+$\overline{X9}$.$\overline{QD}$+$\overline{X14}$) .X5.$\overline{QD}$.$\overline{QC}$.(QA+$\overline{QA}$.QB) | (Count Down for Low False Alarm Rate) |
| + X6. | ($\overline{X8}$+$\overline{S2}$.$\overline{S4}$.$\overline{S6}$.$\overline{S8}$+$\overline{X9}$.$\overline{QD}$+$\overline{X14}$) .($\overline{X4}$.$\overline{X5}$+QD+QC).$\overline{QD}$.QA($\overline{QB}$+$\overline{QC}$) .(X1.X3+X2.X3) | (Automatic Count Up) |
| + X6. | ($\overline{X8}$+$\overline{S2}$.$\overline{S4}$.$\overline{S6}$.$\overline{S8}$+$\overline{X9}$.$\overline{QD}$+$\overline{X14}$) .($\overline{X4}$.$\overline{X5}$+QD+QC).$\overline{QD}$.(QA+ $\overline{QA}$.$\overline{QB}$.$\overline{QC}$) .(X1.X3+X2.X3) | (Automatic Count Down) |
| + $\overline{SQA}_\omega$ .$\overline{QA}$ | | (Recirculate A Zero) |
| SQB$_\omega$ = | | |
| | X6. X8.(S3+S4+S7+S8).(X9+QD).X14 | (Manual Switch Entries) |
| + X6. | ($\overline{X8}$+$\overline{S1}$.$\overline{S2}$.$\overline{S5}$.$\overline{S6}$+$\overline{X9}$.$\overline{QD}$+$\overline{X14}$) .X4.$\overline{QD}$.$\overline{QC}$.(QA+QB) | (Count Up for High False Alarm Rate) |
| + X6. | ($\overline{X8}$+$\overline{S1}$.$\overline{S2}$.$\overline{S5}$.$\overline{S6}$+$\overline{X9}$.$\overline{QD}$+$\overline{X14}$) .X5.$\overline{QD}$.$\overline{QC}$.QB.QA | (Count Down for Low False Alarm Rate) |
| + X6. | ($\overline{X8}$+$\overline{S1}$.$\overline{S2}$.$\overline{S5}$.$\overline{S6}$+$\overline{X9}$.$\overline{QD}$+$\overline{X14}$) .($\overline{X4}$.$\overline{X5}$+QD+QC).$\overline{QD}$.(QB.QA+ QB.$\overline{QA}$+QC.QB).(X1.X3+X2.X3) | (Automatic Count Up) |
| + X6. | ($\overline{X8}$+$\overline{S1}$.$\overline{S2}$.$\overline{S5}$.$\overline{S6}$+$\overline{X9}$.$\overline{QD}$+$\overline{X14}$) .($\overline{X4}$.$\overline{X5}$+QD+QC).$\overline{QD}$.QB.QA. (X1.$\overline{X3}$+$\overline{X2}$.$\overline{X3}$) | (Automatic Count Down) |
| + $\overline{RQB}_\omega$ .QB | | (Recirculate A One) |
| RQB$_\omega$ = | | |
| | X6. X8.(S1+S2+S5+S6).(X9+QD).X14 | (Manual Switch Entries) |
| + X6. | ($\overline{X8}$+$\overline{S3}$.$\overline{S4}$.$\overline{S7}$.$\overline{S8}$+$\overline{X9}$.$\overline{QD}$+$\overline{X14}$) .X4.$\overline{QD}$.$\overline{QC}$.$\overline{QB}$.$\overline{QA}$ | (Count Up for High False Alarm Rate) |
| + X6. | ($\overline{X8}$+$\overline{S3}$.$\overline{S4}$.$\overline{S7}$.$\overline{S8}$+$\overline{X9}$.$\overline{QD}$+$\overline{X14}$) .X5.$\overline{QD}$.$\overline{QC}$.($\overline{QB}$+$\overline{QA}$) | (Count Down for Low False Alarm Rate) |
| + X6. | ($\overline{X8}$+$\overline{S3}$.$\overline{S4}$.$\overline{S7}$.$\overline{S8}$+$\overline{X9}$.$\overline{QD}$+$\overline{X14}$) .$\overline{X4}$.$\overline{X5}$+QD+QC).$\overline{QD}$.($\overline{QA}$.$\overline{QB}$+ QA.QB.$\overline{QC}$).(X1.X3+X2.X3) | (Automatic Count Up) |
| + X6. | ($\overline{X8}$+$\overline{S3}$.$\overline{S4}$.$\overline{S7}$.$\overline{S8}$+$\overline{X9}$.$\overline{QD}$+$\overline{X14}$) .($\overline{X4}$.$\overline{X5}$+QD+QC).$\overline{QD}$.(QB.$\overline{QA}$+ $\overline{QB}$.QA+$\overline{QC}$.QB).(X1.$\overline{X3}$+$\overline{X2}$.$\overline{X3}$) | (Automatic Count Down) |
| + $\overline{SQB}_\omega$ .$\overline{QB}$ | | (Recirculate A Zero) |
| SQC$_\omega$ = | | |
| | X6. X8.(S5+S6+S7+S8).(X9+QD).X14 | (Manual Switch Entries) |
| + X6. | ($\overline{X8}$+$\overline{S1}$.$\overline{S2}$.$\overline{S3}$.$\overline{S4}$+$\overline{X9}$.$\overline{QD}$+$\overline{X14}$).$\overline{QD}$. (QA.QB+QC).(X1.X3+X2.X3) | (Automatic Count Up) |
| + X6. | ($\overline{X8}$+$\overline{S1}$.$\overline{S2}$.$\overline{S3}$.$\overline{S4}$+$\overline{X9}$.$\overline{QD}$+$\overline{X14}$).$\overline{QD}$ QC.(QA+QB).(X1.$\overline{X3}$+$\overline{X2}$.$\overline{X3}$) | (Automatic Count Down) |
| + $\overline{RQC}_\omega$ .QC | | (Recirculate A One) |
| RQC$_\omega$ = | | |
| | X6. X8.(S1+S2+S3+S4).(X9+QD).X14 | (Manual Switch Entries) |
| + X6. | ($\overline{X8}$+$\overline{S5}$.$\overline{S6}$.$\overline{S7}$.$\overline{S8}$+$\overline{X9}$.$\overline{QD}$+$\overline{X14}$).$\overline{QD}$. $\overline{QC}$.($\overline{QA}$+$\overline{QB}$).(X1.X3+X2.X3) | (Automatic Count Up) |
| + X6. | ($\overline{X8}$+$\overline{S5}$.$\overline{S6}$.$\overline{S7}$.$\overline{S8}$+$\overline{X9}$.$\overline{QD}$+$\overline{X14}$).$\overline{QD}$. ($\overline{QA}$.$\overline{QB}$+$\overline{QC}$).(X1.$\overline{X3}$+$\overline{X2}$.$\overline{X3}$) | (Automatic Count Down) |
| + $\overline{SQC}_\omega$ .$\overline{QC}$ | | (Recirculate A Zero) |
| SQD$_\omega$ = | | |
| | X6.X8.X9.X14 | (Manual Switch Entry) |
| + $\overline{RQD}_\omega$ .QD | | (Recirculate A One) |
| RQD$_\omega$ = | | |
| | X6.X8.X13.X14 | (Manual Switch Entry) |
| + $\overline{SQD}_\omega$ .$\overline{QD}$ | | (Recirculate A Zero) |
| SQE$_\omega$ = | | |
| | X6.X8.X10.X14 | (Manual Switch Entry) |
| + $\overline{RQE}_\omega$ .QE | | (Recirculate A One) |
| RQE$_\omega$ = | | |
| | X6.X8.X12.X14 | (Manual Switch Entry) |
| + $\overline{SQE}_\omega$ .$\overline{QE}$ | | (Recirculate A Zero) |

In operation, a code for each quantum area of the surveillance area is either developed automatically or manually selected in accordance with the above-defined Boolean equations. The logic given here assigns highest priority to manual entries, next highest to system false alarm indications, and lowest priority to automatic local area count. Also, the count up and count down rates are the same. These details may be varied to accomodate the requirements of different systems.

Figure 8:
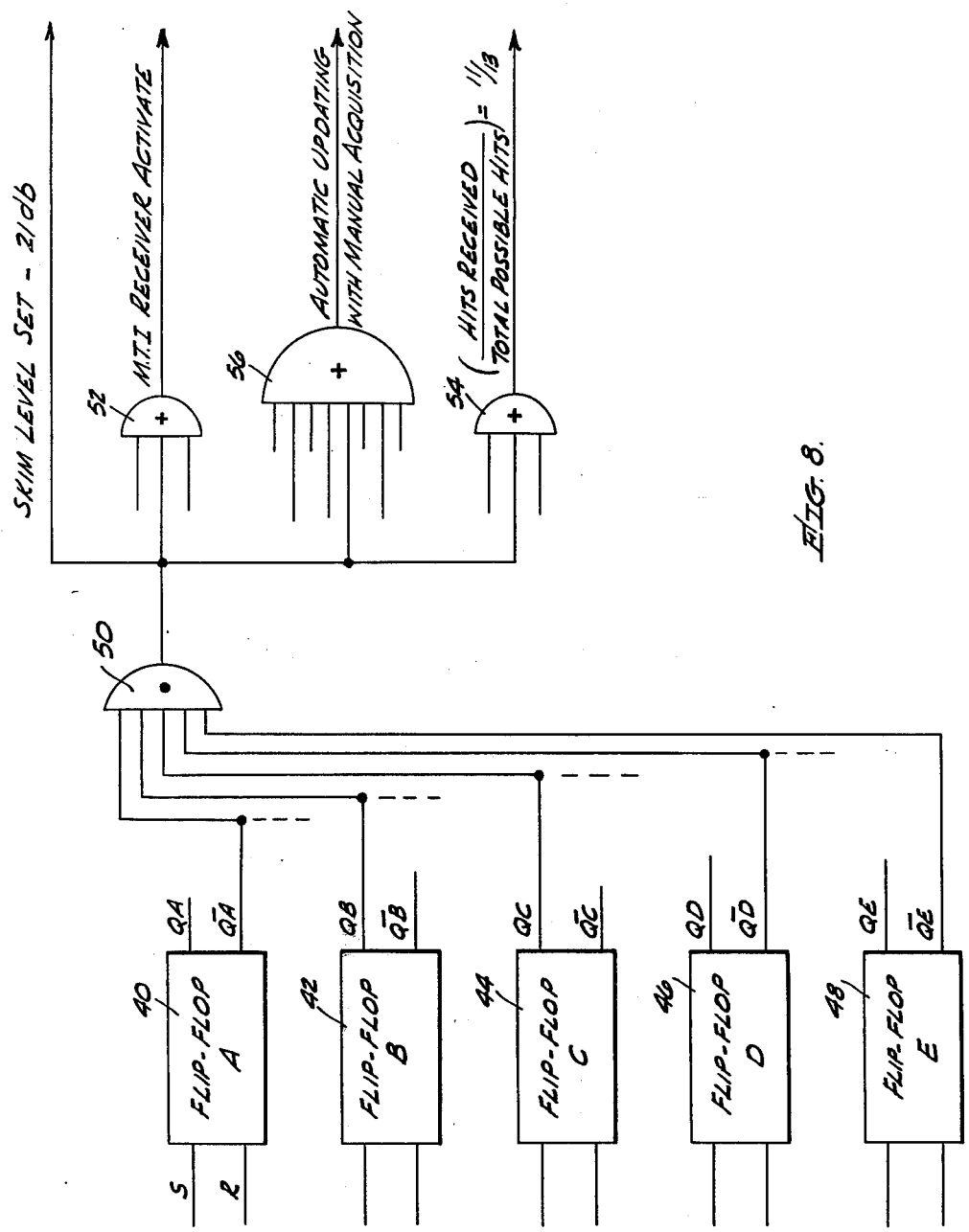
FIG. 8 illustrates an example of control logic included in the memory decoder apparatus (FIG. 2) that operates in response to code bits EDCBA for controlling certain receiving characteristics of the radar system and video quantizer.

Memory decoding apparatus 36 includes gating responsive to the code bits for each quantum area for generating control signals to select the radar receiver, to set the threshold level for video quantizer 20 (FIG. 1), to set the target detection parameters in the valid and invalid video target detectors 14 (FIG. 1), and to set the system operational mode control in the manner defined in Table A. A typical example of this gating is illustrated in FIG. 8. In particular, memory decoding apparatus 36 includes flip-flops A, B, C, D, E, designated 40, 42, 44, 46, 48 respectively, for storing the code bits corresponding to the successive quantum areas of the particular azimuth segment being scanned. An "and" gate 50, for example, has inputs connected to the principal outputs of flip-flops 42, 44 and to the complementary outputs of flip-flops 40, 46, 48, thereby to produce an information level output when the code bits EDCBA are 00110 as illustrated in row 7, Table A. This information level signal sets a skim level of 21 db. in the video quantizer 20, activates the MTI receiver for radar 12 through "or" gate 52, establishes target detection criteria of 11 hits out of 13 possible hits in the valid and invalid target detectors 14 through "or" gate 54, and causes the system to operate in an automatic updating with manual acquisition mode through "or" gate 56. Additional gating is employed in a similar manner to instrument the remaining code bit combinations shown in Table A.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A digital detection criteria control device for operation in conjunction with a radar transmitter-receiver apparatus having range count and azimuth position signals and capable of generating a quantized video signal, said digital detection criteria control device comprising a memory having a predetermined number of words, each of said words having a plurality of sets of first, second and third bits, corresponding sets of said first, second and third bits within each word corresponding to quantum areas within one of a plurality of sectors constituting the surveillance area of said radar transmitter-receiver; means responsive to said range count and azimuth position signals for sensing successive bits of said memory at the same rate as and in synchronism with the bits of said quantized video signal; target detection apparatus responsive to said quantized video signal for determining whether target indications from said quantized video signal are valid or invalid; means for periodically generating code bits and writing said code bits in said memory in response to said target indications for each quantum area of said surveillance area; means for reading said code bits out from said memory in synchronism with coverage of said surveillance area by said radar transmitter-receiver; and means responsive to said code bits read out from said memory for providing control indications for successive corresponding quantum areas of said surveillance area and to switch to preselected types of receivers of said radar transmitter-receiver apparatus for said successive corresponding quantum areas.

2. The digital detection criteria control device as defined in claim 1 wherein said code bits generated and written into said memory increase one in numerical value each scan said valid and invalid target indications are both type.

3. The digital detection criteria control device as defined in claim 1 wherein said code bits generated and written into said memory decrease one in numerical value each scan said valid and invalid target indications are both false.

4. The digital detection criteria control device as defined in claim 1 wherein said code bits generated and written into said memory increase by one every predetermined plurality of scans in response to said valid target indication being true and said invalid targe indication being false.

5. A digital detection criteria control device for operation in conjunction with a surveillance radar transmitter-receiver apparatus having range count and azimuth position signals and capable of generating a quantized video signal, said digital detection criteria control device comprising a memory having a predetermined number of groups of words, each word having a plurality of sets of first, second, third and fourth bits for each of a corresponding plurality of equiangular radial segments constituting the surveillance area of said radar apparatus, the number of said groups of words being equal to the number of quantum sectors in one of said equiangular radial sectors and the number of words in each group being equal to the number of quantum areas in one quantum sector; means including a target detector memory for providing valid and invalid target threshold indications serially by range; means responsive to said range count and azimuth position signals for repeatedly recirculating digital signals derived from corresponding sets of said first, second, third and fourth bits from words of successive groups thereof for a number of times equal to the number of azimuth sweeps in one quantum sector; means once each scan for increasing the count of said digital signals in response to corresponding valid and invalid target threshold indications being true and for decreasing the count of said digital signals in response to corresponding valid and invalid target threshold indications being false; means once every predetermined plurality of scans no less than four for increasing the count of said digital signals in response to a corresponding valid target threshold indication being true together with a corresponding invalid target threshold indication being false; and means responsive to said recirculating digital signals for generating signals to control the receiving characteristics of said radar transmitter-receiver for corresponding quantum areas of said surveillance area.

6. The digital detection criteria control device for operation in conjunction with a surveillance radar transmitter-receiver as defined in claim 5 additionally including a track position correlator for generating a false target alarm rate too high signal in response to a number of targets that do not correlate in position exceeding no less than five per second; and means responsive to the occurrence of a false target alarm rate too high signal for increasing the count of said digital signals.

* * * * *

UNITED STATES PATENT OFFICE
CERTIFICATE OF CORRECTION

PATENT NO. : 3,940,762

DATED : Feb. 24, 1976

INVENTOR(S) : David A. Ethington, Richard D. Wilmot & Herbert Y. Yamashiro

It is certified that error appears in the above-identified patent and that said Letters Patent are hereby corrected as shown below:

Col. 6, line 8     "bits" should be --bins--.

Col. 11, line 42   "type" should be --true--.

Signed and Sealed this eleventh Day of May 1976

[SEAL]

Attest:

RUTH C. MASON
Attesting Officer

C. MARSHALL DANN
Commissioner of Patents and Trademarks